(12) United States Patent
Lee et al.

(10) Patent No.: US 11,380,090 B2
(45) Date of Patent: Jul. 5, 2022

(54) FAST MULTI-MODAL OBJECT RECOGNITION SYSTEM

(71) Applicant: Flytech Technology Co., Ltd., Taipei (TW)

(72) Inventors: Tung-Ying Lee, Taipei (TW); Yi-Heng Tseng, Taipei (TW); Tzu-Wei Huang, Taipei (TW); Che-Wei Lin, Taipei (TW)

(73) Assignee: Flytech Technology Co., Ltd., Taipei (TW)

( * ) Notice: Subject to any disclaimer, the term of this patent is extended or adjusted under 35 U.S.C. 154(b) by 69 days.

(21) Appl. No.: 17/017,198

(22) Filed: Sep. 10, 2020

(65) Prior Publication Data

US 2022/0076015 A1  Mar. 10, 2022

(51) Int. Cl.
*G06V 20/10* (2022.01)
*G06K 9/62* (2022.01)
*G08B 21/18* (2006.01)
*G06T 7/70* (2017.01)

(52) U.S. Cl.
CPC .......... *G06V 20/10* (2022.01); *G06K 9/628* (2013.01); *G06K 9/6256* (2013.01); *G06T 7/70* (2017.01); *G08B 21/18* (2013.01)

(58) Field of Classification Search
None
See application file for complete search history.

(56) References Cited

U.S. PATENT DOCUMENTS

2014/0014722 A1*  1/2014  Goncalves ......... G06K 9/00771
235/383

* cited by examiner

*Primary Examiner* — Leon Flores
(74) *Attorney, Agent, or Firm* — Osha Bergman Watanabe & Burton LLP

(57) ABSTRACT

A method for object recognition at an interactive information system (IIS) includes capturing, using an imaging device of the IIS, a first image of a first representative object which represents a first one or more object disposed about the IIS; analyzing, by a computer processor of the IIS and based on a category model, the first image to determine a first representative category of the first one or more object; retrieving, by the computer processor and based on the first representative category, a first representative object model of a plurality of object models that are stored on a remote server; and analyzing, by the computer processor and based on the first representative object model, the first image to determine a first representative inventory identifier of the first representative object, which represents a first one or more inventory identifier corresponding to the first one or more object respectively.

25 Claims, 7 Drawing Sheets

FAST MULTI-MODAL OBJECT RECOGNITION SYSTEM

BACKGROUND

An interactive information system (IIS) is a computer terminal with specialized hardware and software that provides access to information and applications for communication, commerce, entertainment, education, medical service, or other remote functionalities.

A point-of-sale (POS) terminal is an IIS that provides functionality to facilitate a retail transaction. A POS terminal is commonly used in retail facilities such as a supermarket or the like. A POS terminal employing an object recognition technique may be used for self-checkout transactions. The object recognition technique calculates feature values of a commodity item placed under a scanner, compares the feature values with a dictionary file created in advance, and recognizes the commodity item.

Cloud computing is the on-demand availability of computer system resources, e.g., data storage (referred to as cloud storage) and computing power, over the Internet without direct active management by the user. The computer resources available to a large number of users over the Internet is referred to as the Cloud.

SUMMARY

In general, in one aspect, the invention relates to a method for object recognition at an interactive information system (IIS). The method includes capturing, using an imaging device of the ITS, a first image of a first representative object, wherein the first representative object represents a first one or more object disposed about the IIS, analyzing, by a computer processor of the IIS and based on a category model, the first image to determine a first representative category of the first one or more object, wherein the first representative category represents a first one or more category, retrieving, by the computer processor of the IIS and based on the first representative category, a first representative object model of a plurality of object models that are stored on a remote server, wherein the first representative object model represents a first one or more object model, and analyzing, by the computer processor of the IIS and based on the first representative object model, the first image to determine a first representative inventory identifier of the first representative object, wherein the first representative inventory identifier represents a first one or more inventory identifier corresponding to the first one or more object respectively.

In one aspect, the invention relates to an interactive information system (IIS). The IIS includes an imaging device, a computer processor and memory storing instructions, when executed by the computer processor, comprising functionalities for capturing, using the imaging device of the IIS, a first image of a first representative object, wherein the first representative object represents a first one or more object disposed about the IIS, analyzing, based on a category model, the first image to determine a first representative category of the first one or more object, wherein the first representative category represents a first one or more category, retrieving, based on the first representative category, a first representative object model of a plurality of object models that are stored on a remote server, wherein the first representative object model represents a first one or more object model, and analyzing, based on the first representative object model, the first image to determine a first representative inventory identifier of the first representative object, wherein the first representative inventory identifier represents a first one or more inventory identifier corresponding to the first one or more object respectively.

In another aspect, a non-transitory computer readable medium (CRM) storing computer readable program code for object recognition at an interactive information system (IIS). The computer readable program code, when executed by a computer processor of the IIS, comprises functionality for capturing, using an imaging device of the IIS, a first image of a first representative object, wherein the first representative object represents a first one or more objects disposed about the IIS, analyzing, based on a category model, the first image to determine a first representative category of the first one or more objects, wherein the first representative category represents a first one or more category, retrieving, based on the first representative category, a first representative object model of a plurality of object models that are stored on a remote server, wherein the first representative object model represents a first one or more object model, and analyzing, based on the first representative object model, the first image to determine a first representative inventory identifier of the first representative object, wherein the first representative inventory identifier represents a first one or more inventory identifier corresponding to the first one or more object respectively.

Other aspects of the invention will be apparent from the following description and the appended claims.

DETAILED DESCRIPTION

Figure 1A:
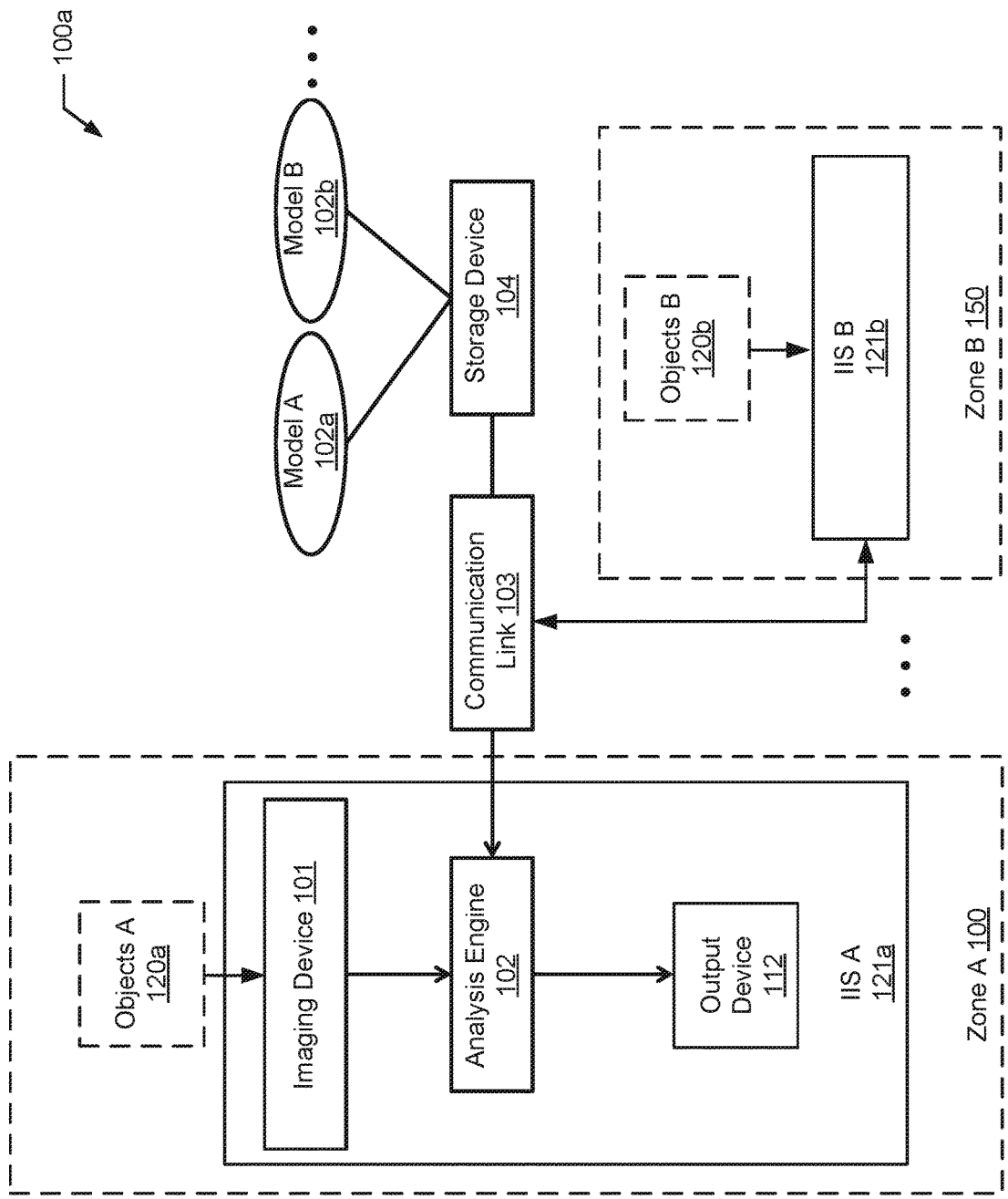
FIGS. 1A-1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, non-transitory computer readable medium, and system to reduce (i) network latency of an interactive information system (IIS) using cloud computing to perform object recognition for commodity items, and (ii) reliance on weighing or barcode scanning to confirm the identification of the commodity items.

In one or more embodiments of the invention, the IIS may be a self-checkout machine. One approach to reduce the network latency is by directly connecting the computing resource for object recognition to the image capture device at the self-checkout machine. In this approach, the computing for object recognition does not endure network delays, but the self-checkout machine requires a powerful computing unit to meet the needs of identifying multiple commodity items. On the other hand, if the self-checkout machine is equipped with a simple computing unit, a network connection device and a remote computing unit are then used to receive and process commodity item images or preliminary features of the images to perform the object recognition. In this way, the operating speed of the self-checkout machine is greatly affected by the network conditions, with significant delays. At present, the self-checkout machine mainly uses additional equipment or labor to achieve anomaly detection, such as using a weighing scale to check whether there is any inconsistency between the object recognition result and the commodity item.

In one or more embodiments, the invention reduces the network latency and the reliance on weighing scale/barcode scanner by employing a remote storage device that connects to all IISs through a communication network. Different IISs are designated to process different types of commodity items that require different object recognition models. The remote storage device stores a hierarchy of object recognition models that are selectively provided to each IIS based on the image content captured at the particular IIS. Because the provided model closely matches the type of commodity items at each IIS, the computing resource (e.g., processor and memory) requirements of the IIS is reduced without compromising the operating speed of the self-checkout transactions. In addition to reducing the network latency, the invention saves cost as well as enhances efficiency and accuracy by reducing equipment, sensors, and human labor.

Figure 1B:
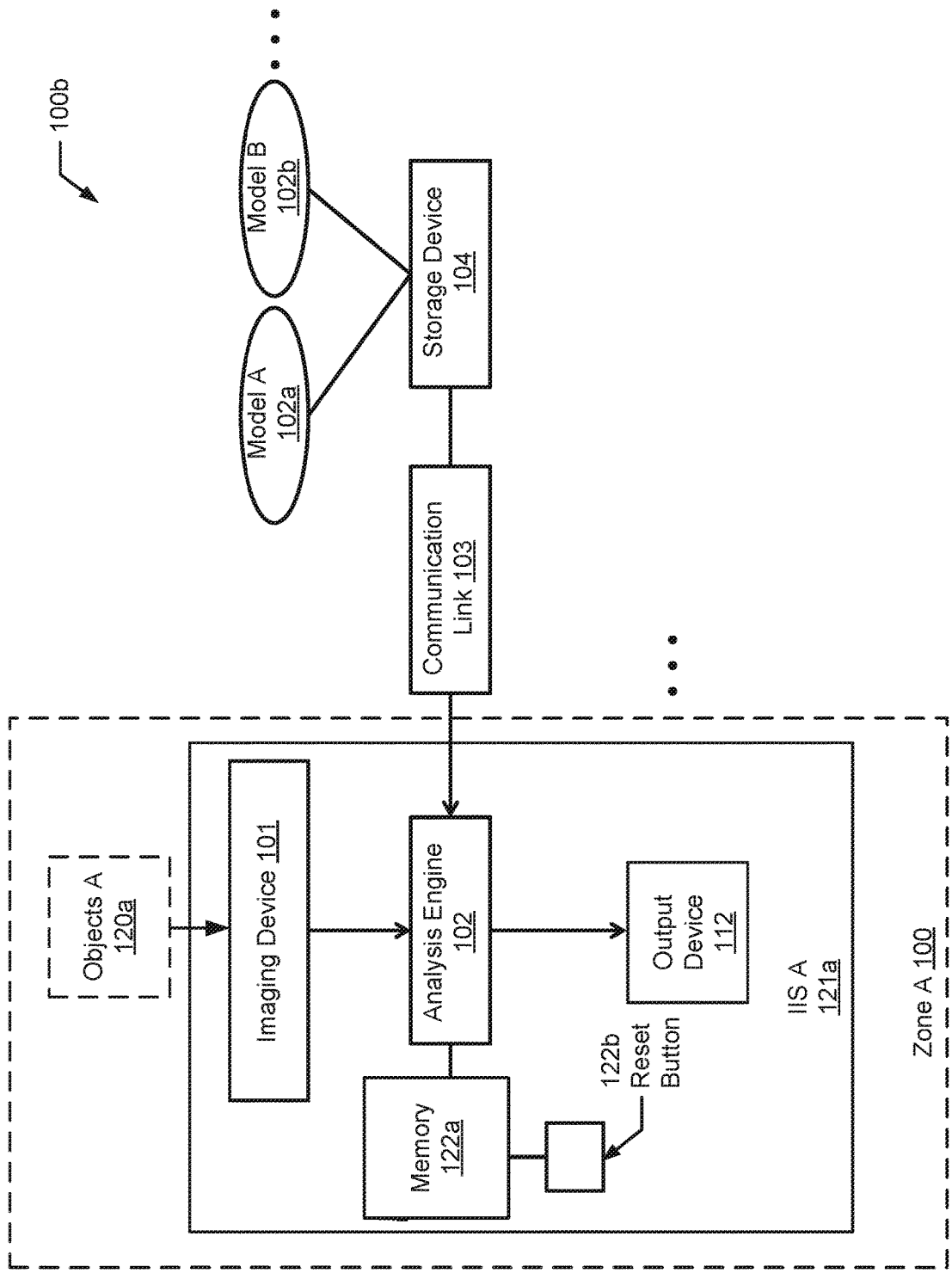
Figure 1C:
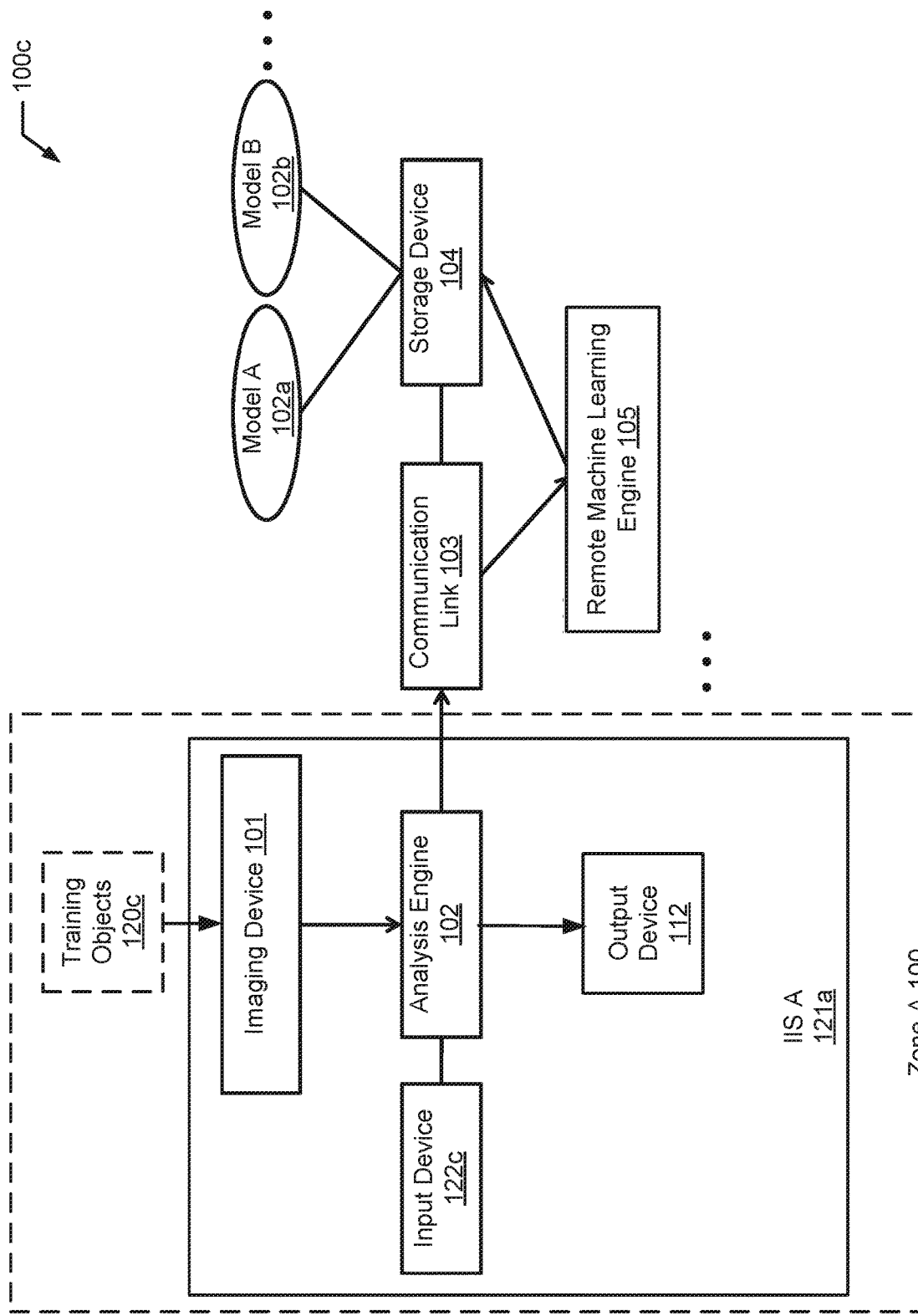

FIGS. 1A, 1B, and 1C show a system in accordance with one or more embodiments of the invention. In one or more embodiments of the invention, one or more elements shown in FIGS. 1A-1C may be omitted, repeated, and/or organized in a different arrangement. Accordingly, the scope of the invention should not be considered limited to the specific arrangement of elements shown in FIGS. 1A-1C.

As shown in FIG. 1A, the system (100a) has multiple components, including, for example, a storage device (104), a communication link (103), an IIS A (121a), and an IIS B (121b). In one or more embodiments of the invention, the IIS A (121a) and IIS B (121b) are two IISs, i.e., POS terminals, among a number of IISs located at respective zones in a retail facility. For example, the retail facility may be a supermarket and each of the zones is a physical area designated to a particular type (i.e., category) of commodity item for sale in the supermarket. The zones are generally defined by a retail worker based on the layout of the retail facility. The retail worker is an employee or a manager of the retail facility. For example, commodity items of a particular category (e.g., fruit category, coffee drink category, bread category, fish category, etc.) may be placed in the respective physical area (e.g., fruit zone, coffee drink zone, bread zone, fish zone, etc.) by the retail worker of the retail facility. In particular, the IIS A (121a) is located in the zone A (100) that is designated to objects A (120a) while the IIS B (121b) is located in the zone B (150) that is designated to objects B (120b). The objects A (120a) are commodity items of one or more particular category that are physically placed within the zone A (100) for convenience of consumers to perform self-checkout transactions using the associated IIS A (121a). In this context, the objects A (120a) are referred to as being disposed about the IIS A (121a). Similarly, the objects B (120b), which are commodity items of the same or different category than objects A (120a), are referred to as being disposed about the IIS B (121b). For example, the objects A (120a) may be different variety of fruits placed within the fruit zone (i.e., zone A (100)) while the objects B (120b) may be different variety of coffee drinks placed within the coffee drink zone (i.e., zone B (150)). For another example, the objects A (120a) may be different variety of fruits placed within a first fruit zone (i.e., zone A (100)) while the objects B (120b) may be other different variety of fruits placed within a second fruit zone (i.e., zone B (150)).

Further as shown in FIG. 1A, the communication link (103) is part of a network of any size having wired and/or wireless segments or a portion of the Internet. The storage device (104) is physically separate from the zones (e.g., zone A (100), zone B (150), etc.) and is part of a remote server. In one or more embodiments, the remote server is a computing device in the Cloud where the communication link (103) includes part of the Internet. In an alternative embodiments, the remote server is installed in a back room of the retail facility away from the IISs and the communication link (103) is a local area network. In one or more embodiments, the storage device (104) is configured to store and provide object recognition models (e.g., model A (102a), model B (102b)). The object recognition model is a computer model used by the IISs (more specifically, the analysis engines of the IISs) to determine the category and inventory identifier of the commodity item. The inventory identifier is a data item specifying information (e.g., universal product code (UPC), stock keeping unit (SKU), etc.) used by the retail facility to track each commodity item in the retail facility. In one or more embodiments, the object recognition models stored in the storage device (104) are hierarchical models. For example, the model A (102a) may be a category model that is used to determine the category of the commodity item. The model B (102b) may be an object model for a particular category that is used to determine a subcategory or the inventory identifier of the commodity item belonging to the particular category. An example of the hierarchical models is described in reference to FIGS. 3A and 3B below. In one or more embodiments, the components described above may be implemented using the computing system (400) described below in reference to FIG. 4. Each of these components is discussed below.

In one or more embodiments, the IIS A (121a) includes an imaging device (101), an analysis engine (102), and an output device (112). The imaging device (101) may be one or more of a camera, a laser scanner, an image sensor, a time-of-flight (ToF) sensor, a depth sensor, or any other standard or specialized optical device. The imaging device (101) is configured to capture a two-dimensional (2D) or three-dimensional (3D) image of one or more object placed on a platform within the field-of-view of the imaging device (101). For example, the one or more object may be selected and removed from the objects A (120a) by a consumer and placed on the platform to perform a self-checkout transaction using the IIS A (121a). The analysis engine (102) may be implemented in hardware (i.e., circuitry), software, or any combination thereof. The analysis engine (102) is configured to analyze the image captured by the imaging device (101) and perform object recognition to generate a result. Generating the result includes determining a category and a count of the one or more object, requesting an object model based on the determined category, determining an inventory identifier of each one or more object, detecting an error condition, and generating an alert based on the error condition. The error condition includes one or more of a mismatch between the object model and the one or more object, overlapping between the one or more object that interferes with optical recognition, placing the one or more object with the representative side facing down or otherwise hidden from the imaging device, or a combination of the above. In one or more embodiments, the analysis engine (102) performs the functionalities above using the method described in reference to FIG. 2 below.

In one or more embodiments, one or more of the determined category, the inventory identifier, and the error condition are presented to the consumer and/or the retail worker using the output device (112). The output device (112) includes one or more of an audio device, a display device, a printer, or other types of standard or specialized user interface device. For example, the output device (112) may be a speaker, a flat panel display, a thermal printer, a retail worker's or customer's mobile devices, etc. In one or more embodiments, the information of the determined category, count, and the inventory identifier is transmitted to a payment processing module (not shown) of the IIS A (121a) to initiate a payment transaction. In alternative embodiments, a list of the determined category, count, and inventory identifier is provided to the consumer to perform a payment transaction using a separate payment device in the retail facility or on the customer's mobile device. In other words, the IIS A (121a) is a simplified self-checkout machine that is used only for object recognition without the functionality of payment processing. For example, the list may be printed as a payment voucher for the consumer or electronically transmitted to a mobile device of the consumer. Because no retail worker is involved in the process, the act of transmitting the information of the determined category, count, and inventory identifier to the payment processing module or providing the list of determined category, count, and inventory identifier to the consumer is referred to as the unattended checkout or the self-checkout transaction.

Although the system (100a) is shown as having two POS terminals (i.e., IIS A (121a), IIS B (121b)) and two models (i.e., model A (102a), model B (102b)), in one or more embodiments of the invention, the system (100a) may have more or fewer POS terminals or other types of IISs, more or fewer models, or any combination of POS terminals, IISs and models. Furthermore, each of these components (IIS A (121a), IIS B (121b), model A (102a), model B (102b)) may be utilized multiple times to carry out an iterative operation. For example, other types of IISs may be located on a manufacturing site and used for factory automation. In particular, such IISs may be used for automatic recognition of commodity items located throughout the manufacturing site, such as parts, sub-assemblies, or other mechanical/electronic components. For example, instead of making purchases, the unattended checkout may be performed for distributing these commodity items to various assembly lines, warehouses, or other inventory locations throughout the manufacturing site.

FIG. 1B shows a system (100b) that is a variation of the system (100a) shown in FIG. 1A above. The IIS B (121b) and the zone B (150) are omitted from FIG. 1B for clarity. The IIS A (121a) shown in FIG. 1B includes a memory (122a) and a reset button (122b) in addition to the elements of the IIS A (121a) shown in FIG. 1A above. In one or more embodiments, the memory (122a) is configured to store the object recognition model retrieved from the storage device (104). For as long as the category of the commodity items stays unchanged for the IIS A (121a), the object recognition model stored in the memory (122a) is continued to be used without being repetitively retrieved from the storage device (104). In the scenario when the environment or settings of the zone A (100) are changed, the reset button (122b) is activated, e.g., by the retail worker, to re-retrieve the object recognition model(s) from the storage device (104). For example, the IIS A (121a) may be reset by the retail worker after a stock change in the zone A (100) where the objects A (120a) are replaced by a different category of commodity items.

FIG. 1C shows a system (100c) that is a variation of the system (100a) shown in FIG. 1A above. The IIS B (121b) and the zone B (150) are omitted from FIG. 1C for clarity. In contrast to the operation phase depicted in FIGS. 1A and 1B above, the system (100c) is set up in a training phase to generate the models (e.g., model A (102a), model B (102b)) based on training objects (120c) and/or training images. The training objects (120c) include objects of different known categories and known inventory identifiers. The training objects (120c) may include real commodity items (e.g., real fruits, real coffee drinks, etc.) or physical replicas (e.g., plastic models of fruits, coffee drinks, etc.) of real commodity items. The IIS A (121a) shown in FIG. 1C includes a input device (122c) in addition to the elements of the IIS A (121a) shown in FIG. 1A above. The input device (122c) includes one or more of a button, a display device, a keyboard, or other types of standard or specialized user interface device. The input device (122c) is configured to obtain training images, which are images of objects in different known categories with known inventory identifiers that are used to generate the models using machine learning techniques. In one or more embodiments, the analysis engine (102) analyzes the captured images of the training objects (120c) and/or training images obtained via the input device (122c) to generate a training dataset. For example, the training dataset may include a collection of training images and captured images of the training objects (120c) where each image is tagged with respective known category and known inventory identifier. In another example, the training dataset may include a collection of extracted machine learning features of the training images and captured images of the training objects (120c) where each extracted machine learning feature is tagged with respective known category and known inventory identifier. The training dataset is transmitted to the remote machine learning engine (105) to generate the models (e.g., model A (102a), model B (102b)) using machine learning techniques. An example of generating the models using machine learning techniques is described in reference to FIGS. 3A and 3B below. In one or more embodiments, the remote machine learning engine (105) is a Cloud computing resource installed with machine learning applications.

Figure 2:
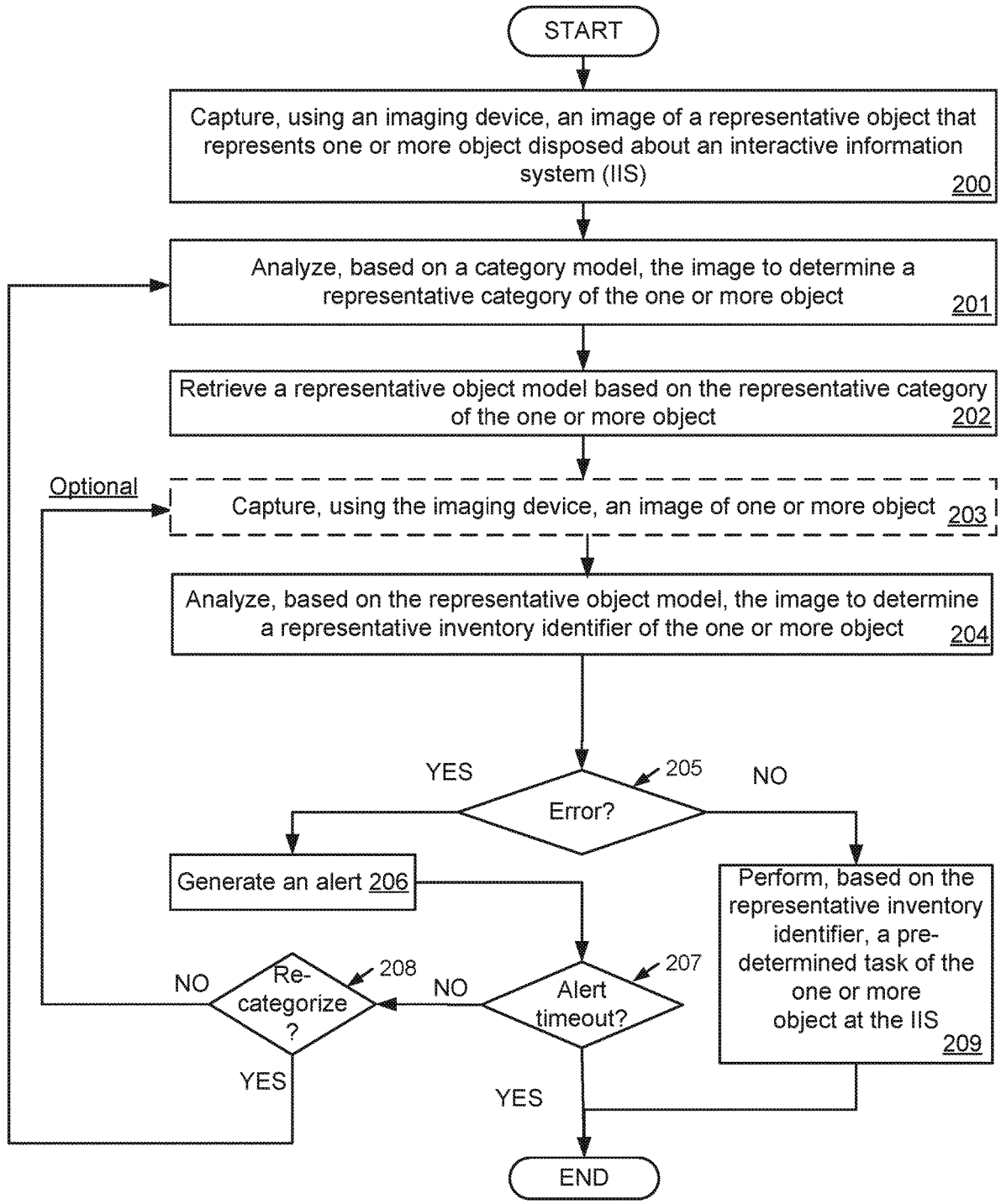
FIG. 2 shows a flowchart in accordance with one or more embodiments of the invention.

FIG. 2 shows a flowchart in accordance with one or more embodiments of the invention. One or more of the steps in FIG. 2 may be performed by the components of the system, discussed above in reference to FIGS. 1A-1C. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially in Step 200, according to one or more embodiments, an image of a representative object is captured using an imaging device of the IIS. In one or more embodiments, a representative object represents one or more object disposed about the IIS for sale. For example, the object may be one or more fruit, coffee drink, piece of bread, etc. In one or more embodiments, the representative object is selected by a retail worker to set up the IIS, e.g., before the store opens to consumers or after a stock change of the IIS. In one or more embodiments, the representative object has a particular representative side, e.g., the topside of a Danish desert. For example, the retail worker places the representative object within the field of view of the imaging device with the representative side unobstructed from the imaging device. Accordingly, the image includes the representative side of the representative object.

In Step 201, the image is analyzed by a computer processor of the IIS and based on a category model to determine a representative category of the one or more object. In one or more embodiments, the representative category represents one or more category. For example, the determined category may be the fruit category if the one or more object is determined to be fruits based on the category model. In another example, the determined category may be the coffee drink category if the one or more object is determined to be coffee drinks based on the category model. In another example, the determined category may be the bread category if the one or more object is determined to be pieces of bread based on the category model. In yet another example, the determined categories may be the fruit category and the coffee drink category if the representative object of the one or more object is determined to be fruits and coffee drinks based on the category model. In one or more embodiments, determining the category of the one or more object employs 2D and/or 3D optical recognition, and may be facilitated by weight measurements.

When the method proceeds to Step 201 from Step 200, the image is a first image of a first representative object which represents a first one or more object disposed about the IIS. In one or more embodiments, as a step to set up the IIS for unattended checkout, the IIS terminal is activated (e.g., by detecting a button push or other form of user input) by the retail worker to capture and analyze the first image to determine at least one category of the one or more object. The determined category of the one or more object disposed about the IIS is referred to as the category associated with or corresponding to the ITS. For example, the IIS may be set up before the stores open to consumers, or after a stock change when the retail worker changes the type (i.e., category) of objects disposed about the ITS. In one or more embodiments, a ready status is presented on the IIS subsequent to retrieving the object model of the representative object. The ready status may be presented using an indicator light (e.g., a light emitting diode (LED)) on the IIS or displayed as a message on a screen of the ITS. The indicator light or the displayed message informs the consumers that the IIS is ready for unattended checkout to purchase one or more of the objects. In one or more embodiments, the ready status also indicates the category associated with the IIS to invite the consumers to use the IIS for checking out the corresponding category of objects.

When the method proceeds to Step 201 from Step 208, the image is a third image of the one or more object disposed about the ITS. In particular, the third image is analyzed based on the category model to re-categorize the one or more object, or more specifically to confirm or update the category of the one or more object.

In Step 202, a representative object model that represents one or more object model of a plurality of object models is retrieved by the computer processor of the IIS based on the determined representative category of the one or more object. For example, a fruit model, a coffee drink model, or a bread model may be retrieved for the fruit category, the coffee drink category, or the bread category, respectively. The object model may be retrieved from a local storage of the ITS. For example, the object model may have been previously used by the IIS. In one or more embodiments, if the object model is not available in the local storage, the object model is retrieved from a collection of object models that are stored on a remote server. For example, the object model may be retrieved via the Internet from the remote server in the Cloud. In another example, the object model may be retrieved via a local area network from the remote server installed in a back room of the retail location away from the IIS.

In Step 203, in one or more embodiment, a second image of one or more object is captured using the imaging device of the IIS. Step 203 is optional and illustrates a subsequent recognition process where the second image is analyzed based on the representative object model used by a previous transaction.

In Step 204, the image of the one or more object is analyzed, based on the representative object model, by the computer processor of the IIS to determine a representative inventory identifier which represents one or more inventory identifier for each of the one or more object. For example, if the object model is the fruit model, the inventory identifier may identify the one or more object as an apple, a banana, a citrus fruit, or some other type of fruit. In another example, the inventory identifier may also identify additional characteristics of the object, such as color, size, variety, weight, price, etc. of the fruit. For example, the inventory identifier may identify object as a red delicious apple, a yellow delicious apple, a large banana, a small banana, a naval orange, a lemon, etc. In one or more embodiments, determining the inventory identifier of the one or more object employs 2D and/or 3D optical recognition, and may be facilitated by weight measurements.

When the method proceeds to Step 204 from Steps 200, 201, and 202, the image is the first image of the first representative object which represents the first one or more object disposed about the IIS. For example, as a step to set up the IIS for unattended checkout, the IIS is activated by the retail worker. In another example, the IIS is used by a first user, so Step 203 is omitted.

When the method proceeds to Step 204 from Step 203, the image is the second image of one or more object disposed about the IIS. For example, when overlapping between the one or more object that interferes with optical recognition or placing the one or more object with the representative side facing down or otherwise hidden from the imaging device happens, the image of the one or more object shall be recaptured by the imaging device to determine the inventory identifier. In another example, the IIS is used by a second user, so the second image of the second one or more object will be captured and analyzed, based on the representative object model used by a previous transaction, to determine the inventory identifier.

In one or more embodiments, the object model is a hierarchical model and determining the inventory identifier includes determining that the one or more object is associated with a subcategory of the determined category of the objects. In one or more embodiments, a part of the representative object is determined being associated with a representative subcategory of the representative category based on the representative object model, a part of the representative object model corresponding to the representative subcategory will be retrieved based on the representative subcategory in order to determine the inventory identifier. For example, the fruit model may identify the one or more object as a round fruit (e.g., an apple or a citrus fruit), which is a subcategory (i.e., round fruit subcategory) of the fruit category. Accordingly, a round fruit model is retrieved based on the round fruit subcategory and used to identify the inventory identifier. For example, the one or more object may include a banana, a red delicious apple, and a lemon.

The inventory identifier of the banana is directly determined based on the fruit model. The red delicious apple and the lemon causes the round fruit model to be retrieved and used to determine the respective inventory identifiers. In one or more embodiments, the representative subcategory may represent one or more subcategory.

In Step 205, a determination is made as to whether an error is detected in determining the inventory identifier of the one or more object. If the determination is positive, i.e., an error is detected, the method proceeds to Step 206. If the determination is negative, i.e., no error is detected, the method proceeds to Step 209.

In Step 206, an alert is generated in response to detecting the error of determining the inventory identifier. In one or more embodiments, the error condition includes a placement violation of the one or more object, a mismatch between the object model and the one or more object, or a combination of the above. For example, the placement violation may result from overlapping between the one or more object that interferes with optical recognition, placing the one or more object with the representative side facing down or otherwise hidden from the imaging device, or a combination of the above.

In Step 207, a determination is made as to whether an alert timeout condition is detected. The alert timeout condition is the condition that multiple alerts have been generated more than a pre-determined maximum number of times (i.e., the timeout threshold) before the unattended checkout is successfully performed for the one or more object. If the determination is positive, i.e., timeout condition is detected, the method ends. In particular, the alert presented by the IIS remains for further corrective action by the retail worker. For example, the retail worker may activate the reset button on the IIS to perform re-categorization using the category model. If the determination is negative, i.e., no timeout condition is detected, the method proceeds to Step 208.

In Step 208, a determination is made as to whether the one or more object is to be re-categorized. If the determination is positive, i.e., re-categorization is to be done, the method returns to Step 201. In one or more embodiments, the IIS is configured (e.g., as a default configuration set at the factory or as a user configuration performed by the retail worker) to perform re-categorization in response to the alert until the alert timeout condition. For example, the re-categorization may be performed upon the very first time the alert is generated. In this example, a single IIS supports multiple categories of objects. In other words, the object model is automatically updated if the object to check out is different from the previous unattended checkout transaction. In another example, the re-categorization may be performed upon the number of times the alert has been generated exceeds a pre-determined number of times (e.g., 2 times, 3 times, etc.). In an alternative embodiments, the re-categorization is activated by the retail worker pushing a button on the IIS or entering a command on a user interface display of the IIS. For example, the IIS may halt in Step 208 until the determination is made by the retail worker as to whether to perform the re-categorization.

If the determination in Step 208 is negative, i.e., no re-categorization is to be done, the method returns to Step 203. In one or more embodiments, the IIS is configured (e.g., as a default configuration set at the factory or as a user configuration performed by the retail worker) to skip re-categorization in response to the alert. For example, the re-categorization may never be performed regardless of the alert. In the scenario where the error is due to a placement violation, the iterative loop from Step 203 through Step 208 allows the consumer to correct any overlapping between the objects that interferes with optical recognition and ensure that the one or more object are placed with the representative side facing up and not hidden from the imaging device. Once the placement violation is corrected, the error no longer occurs and the method will exit the iterative loop and proceed to Step 209. In another example, the re-categorization may be bypassed or skipped until the alert has been generated a pre-determined number of times (e.g., 2 times, 3 times, etc.). In other words, if the error continues to occur more than the pre-determined number of times, the re-categorization is skipped. In an alternative embodiments, the re-categorization is bypassed or otherwise skipped by the retail worker pushing a button on the IIS or entering a command on a user interface display of the IIS. For example, the IIS may halt in Step 208 until the determination is made by the retail worker as to whether to perform the re-categorization.

In Step 209, a pre-determined task such as the unattended checkout of the one or more object at the IIS is performed by the computer processor of the IIS based on the inventory identifier of the one or more object. In one or more embodiments, the determined category, count, and inventory identifier are transmitted to the payment processing module of the IIS to initiate a payment transaction. In alternative embodiments, a printed list of determined category, count, and inventory identifier is provided to the consumer to perform the payment transaction using a separate payment machine in the retail facility or a payment application on the retail work's or the customer's mobile device.

Although the flowchart described above is specific to the particular embodiment of IISs, i.e., POS terminals, in other embodiments, the flowchart may be performed using other types of IISs, such as the factory automation IISs described in reference to FIG. 1A above. As noted above, such IISs may be used for automatic recognition of commodity items located throughout the manufacturing site, such as parts, sub-assemblies, or other mechanical/electronic components. For example, instead of making payments for purchases, the self-checkout may be performed for distributing these commodity items to various assembly lines, warehouses, or other inventory locations throughout the manufacturing site.

In one embodiment, in a normal condition for a setup of the IIS or the first user's self-checkout task without an alert, the method flow includes the sequence of steps of:

Step 200→Step 201→Step 202→Step 204→Step 205→Step 209.

In another example, in a setup of the IIS or the first user's self-checkout task with an alert condition of placement violation, the method flow includes the sequence of steps of:

Step 200→Step 201→Step 202→Step 204→Step 205→Step 206→Step 207→Step 208→Step 203→Step 204→Step 205→Step 209.

In another embodiment, in a normal condition for the second and subsequent users' self-checkout task where the object can be recognized based on the object model used in the previous transaction without an alert, the method flow includes the sequence of steps of:

Step 203→Step 204→Step 205→Step 209.

In a combined example where the second and subsequent users' self-checkout contains the object of a different category to the previous transaction, for instance the first self-checkout is for a bread and the subsequent self-checkout is for a fruit, the method flow includes the sequence of steps of:

Step 203→Step 204→Step 205→Step 206→Step 207→Step 208→Step 201→Step 202→Step 204→Step 205→Step 209.

In another combined example where the second and subsequent users' self-checkout contains the object of the same category as the previous transaction and the object of the different category to the previous transaction, for instance the first self-checkout is for a bread and the subsequent self-checkout is for a fruit and a bread together, the method flow includes the sequence of steps of:

Step 203→Step 204→Step 205→Step 206→Step 207→Step 208→Step 201→Step 202→Step 204→Step 205→Step 209.

In yet another combined example where the second and subsequent users' self-checkout contains the object of the same category as the previous transaction but with placement violation, for instance the first self-checkout is for a bread and the subsequent self-checkout is for a bread with placement violation, the method flow includes the sequence of steps of:

Step 203→Step 204→Step 205→Step 206→Step 207→Step 208→Step 203→Step 204→Step 205→Step 209.

Figure 3A:
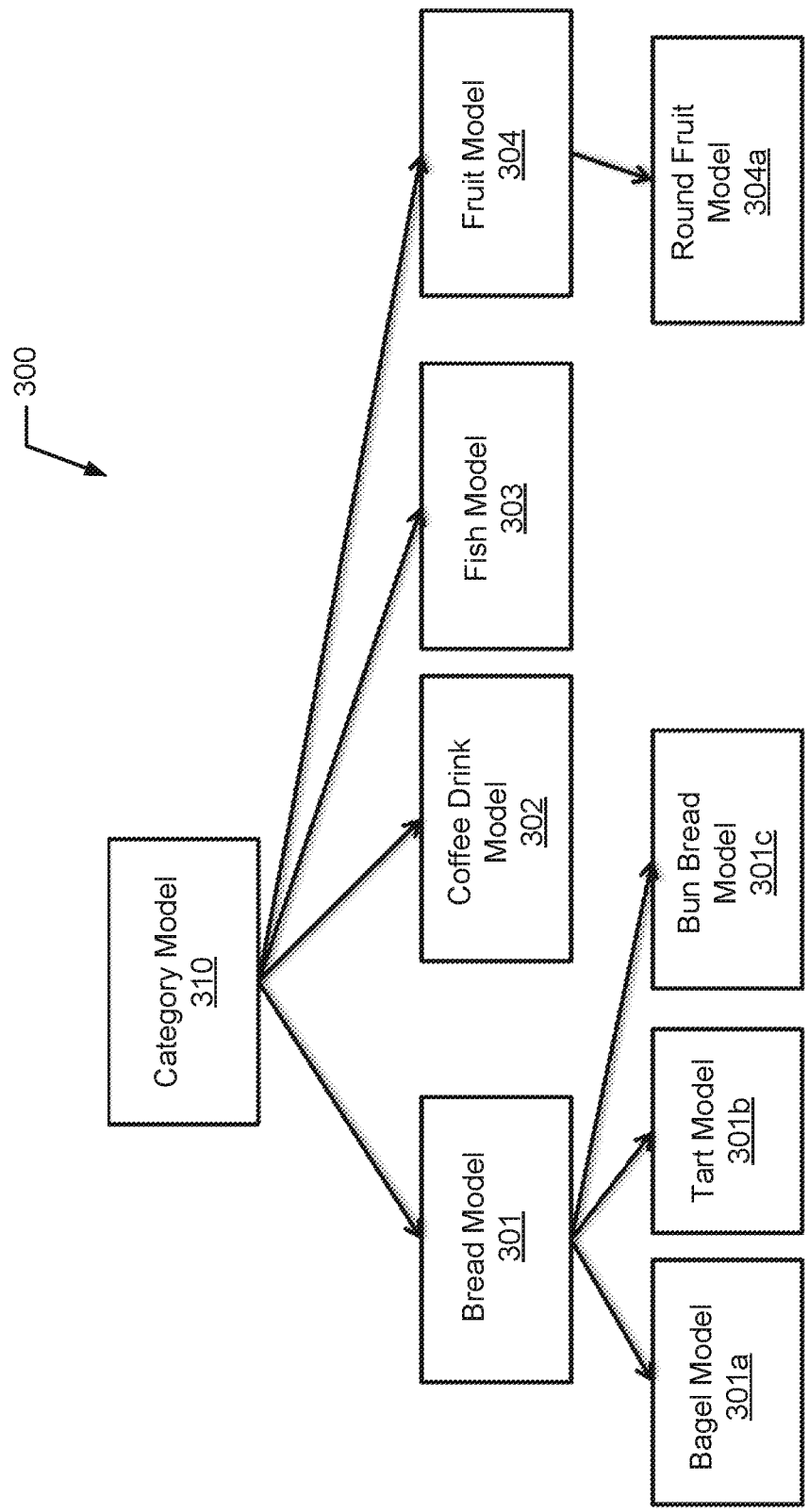
FIGS. 3A-3B show an implementation example in accordance with one or more embodiments of the invention.

FIG. 3A shows an example of models (300) depicted in FIGS. 1A-1C above. In one or more embodiments of the invention, one or more elements shown in FIG. 3A may be omitted, repeated, and/or organized in a different arrangement. Accordingly, the scope of the invention should not be considered limited to the specific arrangement of elements shown in FIG. 3A.

As shown in FIG. 3A, the models (300) include a hierarchy of object recognition models. In particular, the top level of the hierarchy includes a category model (310). In addition, the second level of the hierarchy includes a bread model (301), a coffee drink model (302), a fish model (303), and a fruit model (304) that are child nodes of the category model (310) in the hierarchy. Further, the third level of the hierarchy includes a bagel model (301a), a tart model (301b), and a bun bread model (301c) that are child nodes of the bread model (301) in the hierarchy. The third level of the hierarchy also includes a round fruit model (304a) that is a child node of the fruit model (304) in the hierarchy.

As an example, the category mode (310) may be a convolutional neural network (CNN), such as the AlexNet, to reduce the required partition. However, the category model may be a detection model if multiple objects belonging to different immediate subcategories are expected in the image at the same. A detection model, such as YOLO, can be used for identifying each object bounding box with the corresponding subcategory. The different bounding boxes could be further analyzed by using corresponding models. The other object models may be a deep machine learning model, such as the YOLO or VGG16-SSD, to detect the object. To generate the category model (310), a large number of images showing representative and non-representative sides of commodity items stocked in the retail facility are collected to train the CNN model. The images may be 2D or 3D images. For example, a time-of-flight (TOF) ranging sensor may be used to gather 3D spatial information of objects in the 3D images.

To generate the other object recognition models, zoning and product information are collected for all commodity items in the retail facility. For example, stocked commodity items in the retail facility may include 120 varieties in the bread zone, 60 varieties in the fruit zone, 30 varieties in the coffee drink zone, and 20 varieties in the fish zone. In the example of the detection deep learning model VGG16-SSD where VGG16 performs feature extraction and SSD performing positioning and classification, the model may be further expanded. The model expansion may include modifying feature extraction networks, such as changing to Resnet or Mobilenet, or increasing the number of network layers and increasing the number of channels per network layer. Further, the model expansion may include different combinations, such as Resnet101-SSD, Resnet53-SSD, VGG16-SSD, Mobilenet-SSD. The different network architectures produced by these combinations are referred to as N1, N2, N3, and N4. For different numbers of categories and pre-level network architecture, each of N1, N2, N3, and N4 may be subdivided, such as N1_120, N2_230, etc., where the number after the underscore is the number of categories. After each network architecture is matched with the number of categories, the computing time and resource consumption can be estimated on the analysis engine. In the training phase, all commodity item varieties and network architectures are arranged and combined to generate the bread model (301), coffee drink model (302), fish model (303), and fruit model (304).

Figure 3B:
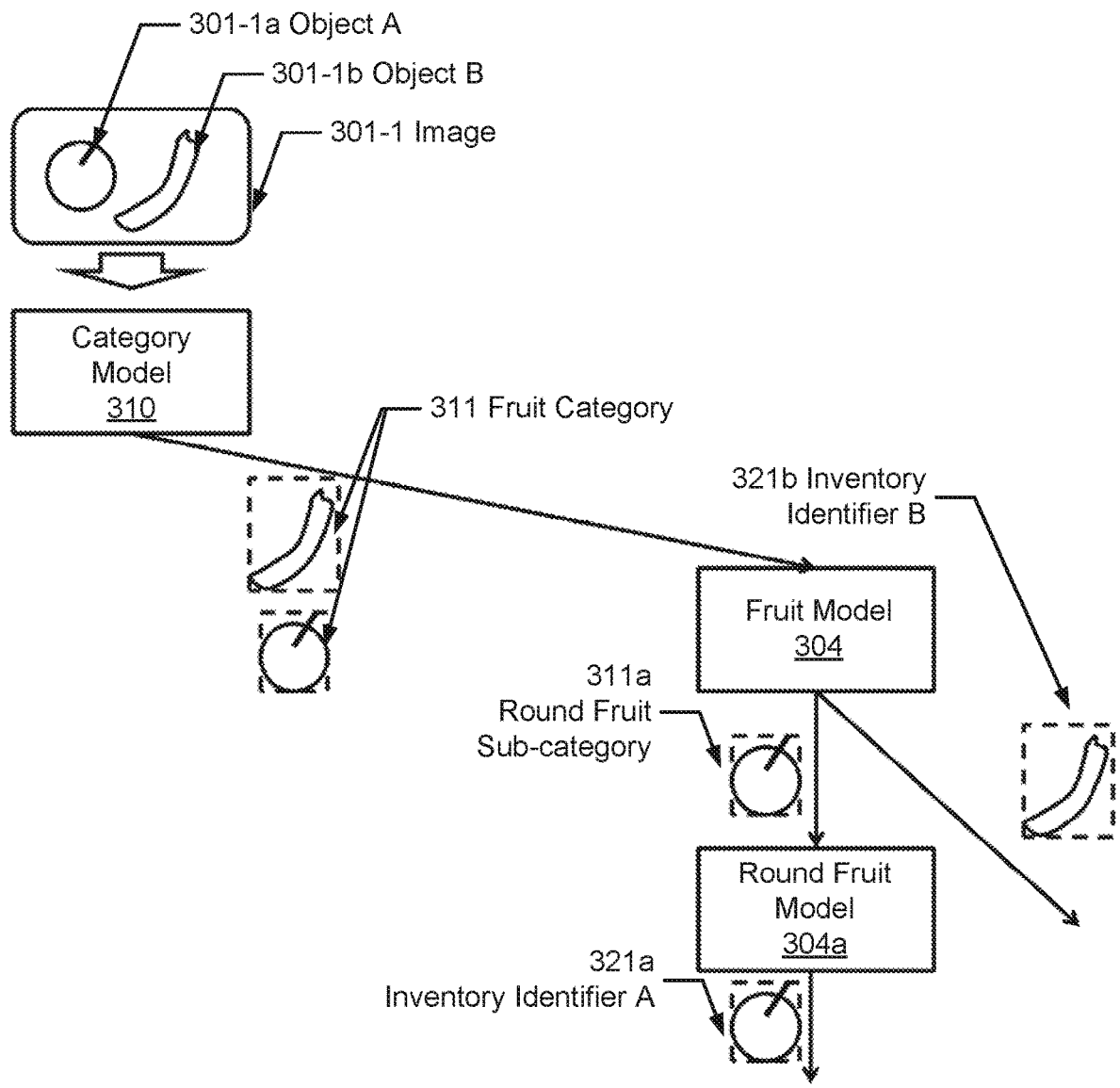

FIG. 3B shows an example of object recognition flow according to the method flowchart depicted in FIG. 2 above. In one or more embodiments of the invention, one or more elements shown in FIG. 3B may be omitted, repeated, and/or organized in a different arrangement. Accordingly, the scope of the invention should not be considered limited to the specific arrangement of elements shown in FIG. 3B.

As shown in FIG. 3B, the image (301-1) of an object A (301-1a) and an object B (301-1b) is analyzed by the analysis engine based on the category model (310) to determine that both objects are in the fruit category (311). In response, the fruit model (304) is retrieved by the IIS. Accordingly, the image (301-1) is further analyzed by the analysis engine based on the fruit model (304) to determine that (i) the object A (301-1a) in the image (301-1) is in the round fruit subcategory (311a), and (ii) the object B (301-1b) has the inventory identifier B (321b) indicating a banana. In addition, the round fruit model (304a) is retrieved by the IIS in response to determining the round fruit subcategory (311a). Accordingly, the image (301-1) is further analyzed by the analysis engine based on the round fruit model (304a) to determine that the object A (301-1a) in the image (301-1) has the inventory identifier indicating a red delicious apple.

Figure 4:
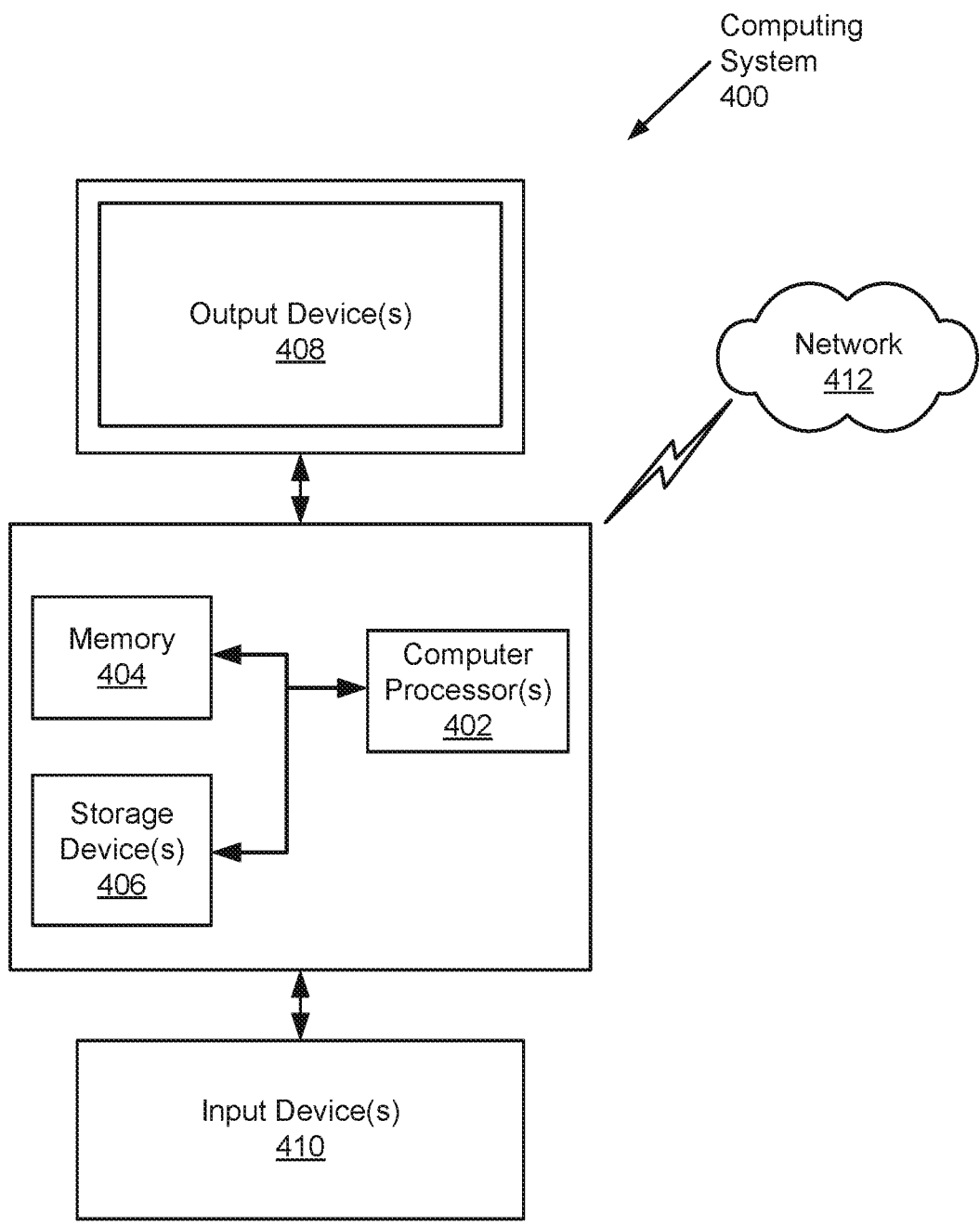
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for object recognition at an interactive information system (IIS), the method comprising:
   capturing, using an imaging device of the IIS, a first image of a first representative object, wherein the first representative object represents a first one or more object disposed about the IIS;
   analyzing, by a computer processor of the IIS and based on a category model, the first image to determine a first representative category of the first one or more object, wherein the first representative category represents a first one or more category;
   retrieving, by the computer processor of the IIS and based on the first representative category, a first representative object model of a plurality of object models that are stored on a remote server, wherein the first representative object model represents a first one or more object model;
   analyzing, by the computer processor of the IIS and based on the first representative object model, the first image to determine a first representative inventory identifier of the first representative object, wherein the first representative inventory identifier represents a first one or more inventory identifier corresponding to the first one or more object respectively;
   capturing, using the imaging device of the IIS, a third image of a third representative object, wherein the third representative object represents a third one or more object disposed about the IIS; and
   in response to a user activation or a failure of determining a third representative inventory identifier of the third representative object based on the first representative object model;
      analyzing, by the computer processor of the IIS and based on the category model, the third image to determine a second representative category of the third one or more object, wherein the second representative category represents a second one or more category;
      retrieving, by the computer processor of the IIS and based on the second representative category, a second representative object model of the plurality of object models that are stored on the remote server, wherein the second representative object model represents a second one or more object model; and
      analyzing, by the computer processor of the IIS and based on the second representative object model, the third image to determine the third representative inventory identifier of the third representative object, wherein the third representative inventory identifier represents a third one or more inventory identifier corresponding to the third one or more object respectively.

2. The method of claim 1, further comprising:
   performing, by the computer processor of the IIS and based on the first one or more inventory identifier, the unattended checkout of the first one or more object at the IIS.

3. The method of claim 1, further comprising:
   capturing, using the imaging device of the IIS, a second image of a second representative object, wherein the second representative object represents a second one or more object disposed about the IIS; and
   analyzing, by the computer processor of the IIS and based on the first representative object model, the second image to determine a second representative inventory identifier of the second representative object, wherein the second representative inventory identifier represents a second one or more inventory identifier corresponding to the second one or more object respectively.

4. The method of claim 1, further comprising:
   generating, in response to detecting a placement violation of the first one or more object, an alert to correct the placement violation.

5. The method of claim 1, wherein determining the first representative inventory identifier of the first one or more object further comprises:
   determining, by the computer processor of the IIS and based on a result of analyzing the first image based on the first representative object model, that a part of the first representative object is associated with a first representative subcategory of the first representative category, wherein the first representative subcategory represents a first one or more subcategory; and retrieving, by the computer processor of the IIS and based on the first representative subcategory, a part of the first representative object model corresponding to the first representative subcategory.

6. The method of claim 1, further comprising:

generating, by the computer processor of the IIS and using a first machine learning algorithm, the category model based on a first learning data set comprising a first plurality of training objects corresponding to a plurality of categories; and generating, by the computer processor of the IIS and using a second machine learning algorithm, an object model based on a second learning data set comprising a second plurality of training objects corresponding to a category of a plurality of objects.

7. An interactive information system (IIS), comprising:

an imaging device;

a computer processor; and memory storing instructions, when executed by the computer processor, comprising functionalities for:

capturing, using the imaging device of the IIS, a first image of a first representative object, wherein the first representative object represents a first one or more object disposed about the IIS;

analyzing, based on a category model, the first image to determine a first representative category of the first one or more object, wherein the first representative category represents a first one or more category;

retrieving, based on the first representative category, a first representative object model of a plurality of object models that are stored on a remote server, wherein the first representative object model represents a first one or more object model;

analyzing, based on the first representative object model, the first image to determine a first representative inventory identifier of the first representative object, wherein the first representative inventory identifier represents a first one or more inventory identifier corresponding to the first one or more object respectively;

capturing, using the imaging device of the IIS, a third image of a third representative object, wherein the third representative object represents a third one or more object disposed about the IIS; and in response to a user activation or a failure of determining a third representative inventory identifier of the third representative object based on the first representative object model:

analyzing, based on the category model, the third image to determine a second representative category of the third one or more object, wherein the second representative category represents a second one or more category;

retrieving, based on the second representative category, a second representative object model of the plurality of object models that are stored on the remote server, wherein the second representative object model represents a second one or more object model; and analyzing, based on the second representative object model, the third image to determine the third representative inventory identifier of the third representative object, wherein the third representative inventory identifier represents a third one or more inventory identifier corresponding to the third one or more object respectively.

8. The IIS of claim 7, the instructions, when executed by the computer processor, further comprising functionalities for:

performing, based on the first one or more inventory identifier, the unattended checkout of the first one or more object at the IIS.

9. The IIS of claim 7, the instructions, when executed by the computer processor, further comprising functionalities for:

capturing, using the imaging device of the ITS, a second image of a second representative object, wherein the second representative object represents a second one or more object disposed about the ITS; and analyzing, based on the first representative object model, the second image to determine a second representative inventory identifier of the second representative object, wherein the second representative inventory identifier represents a second one or more inventory identifier corresponding to the second one or more object respectively.

10. The IIS of claim 7, the instructions, when executed by the computer processor, further comprising functionalities for:

generating, in response to detecting a placement violation of the first one or more object, an alert to correct the placement violation.

11. The IIS of claim 7, wherein determining the first representative inventory identifier of the first one or more object further comprises:

determining, based on a result of analyzing the first image based on the first representative object model, that a part of the first representative object is associated with a first representative subcategory of the first representative category, wherein the first representative subcategory represents a first one or more subcategory; and retrieving, based on the first representative subcategory, a part of the first representative object model corresponding to the first representative subcategory.

12. The IIS of claim 7, the instructions, when executed by the computer processor, further comprising functionalities for:

generating, using a first machine learning algorithm, the category model based on a first learning data set comprising a first plurality of training objects corresponding to a plurality of categories; and generating, using a second machine learning algorithm, an object model based on a second learning data set comprising a second plurality of training objects corresponding to a category of a plurality of objects.

13. The IIS of claim 7, wherein the IIS is coupled to a storage device configured to selectively store the category model and the plurality of object models.

14. The IIS of claim 7, wherein the IIS is coupled to a remote machine learning engine configured to generate the category model and the plurality of object models.

15. A non-transitory computer readable medium (CRM) storing computer readable program code for object recognition at an interactive information system (IIS), wherein the computer readable program code, when executed by a computer processor of the IIS, comprises functionalities for:

capturing, using an imaging device of the IIS, a first image of a first representative object, wherein the first representative object represents a first one or more objects disposed about the IIS;

analyzing, based on a category model, the first image to determine a first representative category of the first one or more object, wherein the first representative category represents a first one or more category;
retrieving, based on the first representative category, a first representative object model of a plurality of object models that are stored on a remote server, wherein the first representative object model represents a first one or more object model;
analyzing, based on the first representative object model, the first image to determine a first representative inventory identifier of the first representative object, wherein the first representative inventory identifier represents a first one or more inventory identifier corresponding to the first one or more object respectively;
capturing, using the imaging device of the IIS, a third image of a third representative object, wherein the third representative object represents a third one or more object disposed about the IIS; and
in response to a user activation or a failure of determining a third representative inventory identifier of the third representative object based on the first representative object model:
analyzing, based on the category model, the third image to determine a second representative category of the third one or more object, wherein the second representative category represents a second one or more category;
retrieving, based on the second representative category, a second representative object model of the plurality of object models that are stored on the remote server, wherein the second representative object model represents a second one or more object mode; and
analyzing, based on the second representative object model, the third image to determine the third representative inventory identifier of the third representative object, wherein the third representative inventory identifier represents a third one or more inventory identifier corresponding to the third one or more object respectively.

16. The CRM of claim 15, the computer readable program code, when executed by the computer processor, further comprising functionalities for:
performing, based on the first one or more inventory identifier, the unattended checkout of the first one or more object at the IIS.

17. The CRM of claim 15, the computer readable program code, when executed by the computer processor, further comprising functionalities for:
capturing, using the imaging device of the IIS, a second image of a second representative object, wherein the second representative object represents a second one or more object disposed about the IIS; and
analyzing, based on the first representative object model, the second image to determine a second representative inventory identifier of the second representative object, wherein the second representative inventory identifier represents a second one or more inventory identifier corresponding to the second one or more object respectively.

18. The CRM of claim 15, the computer readable program code, when executed by the computer processor, further comprising functionalities for:
generating, in response to detecting a placement violation of the first one or more object, an alert to correct the placement violation.

19. The CRM of claim 15, wherein determining the first representative inventory identifier of the first one or more object further comprises:

determining, based on a result of analyzing the first image based on the first representative object model, that a part of the first representative object is associated with a first representative subcategory of the first representative category, wherein the first representative subcategory represents a first one or more subcategory; and
retrieving, based on the first representative subcategory, a part of the first representative object model corresponding to the first representative subcategory.

20. A method for object recognition at an interactive information system (IIS), the method comprising:
capturing, using an imaging device of the IIS, a first image of a first representative object, wherein the first representative object represents a first one or more object disposed about the IIS;
analyzing, by a computer processor of the IIS and based on a category model, the first image to determine a first representative category of the first one or more object, wherein the first representative category represents a first one or more category;
retrieving, by the computer processor of the IIS and based on the first representative category, a first representative object model of a plurality of object models that are stored on a remote server, wherein the first representative object model represents a first one or more object model; and
analyzing, by the computer processor of the IIS and based on the first representative object model, the first image to determine a first representative inventory identifier of the first representative object, wherein the first representative inventory identifier represents a first one or more inventory identifier corresponding to the first one or more object respectively,
wherein determining the first representative inventory identifier of the first one or more object further comprises:
determining, by the computer processor of the IIS and based on a result of analyzing the first image based on the first representative object model, that a part of the first representative object is associated with a first representative subcategory of the first representative category, wherein the first representative subcategory represents a first one or more subcategory; and
retrieving, by the computer processor of the IIS and based on the first representative subcategory, a part of the first representative object model corresponding to the first representative subcategory.

21. An interactive information system (IIS), comprising:
an imaging device;
a computer processor; and
memory storing instructions, when executed by the computer processor, comprising functionalities for:
capturing, using the imaging device of the ITS, a first image of a first representative object, wherein the first representative object represents a first one or more object disposed about the ITS;
analyzing, based on a category model, the first image to determine a first representative category of the first one or more object, wherein the first representative category represents a first one or more category;
retrieving, based on the first representative category, a first representative object model of a plurality of object models that are stored on a remote server, wherein the first representative object model represents a first one or more object model; and
analyzing, based on the first representative object model, the first image to determine a first representative inventory identifier of the first representative object, wherein the first representative inventory identifier represents a first one or more inventory identifier corresponding to the first one or more object respectively;

wherein determining the first representative inventory identifier of the first one or more object further comprises:

determining, based on a result of analyzing the first image based on the first representative object model, that a part of the first representative object is associated with a first representative subcategory of the first representative category, wherein the first representative subcategory represents a first one or more subcategory; and retrieving, based on the first representative subcategory, a part of the first representative object model corresponding to the first representative subcategory.

22. A non-transitory computer readable medium (CRM) storing computer readable program code for object recognition at an interactive information system (IIS), wherein the computer readable program code, when executed by a computer processor of the ITS, comprises functionalities for:

capturing, using an imaging device of the ITS, a first image of a first representative object, wherein the first representative object represents a first one or more objects disposed about the ITS;

analyzing, based on a category model, the first image to determine a first representative category of the first one or more object, wherein the first representative category represents a first one or more category;

retrieving, based on the first representative category, a first representative object model of a plurality of object models that are stored on a remote server, wherein the first representative object model represents a first one or more object model; and analyzing, based on the first representative object model, the first image to determine a first representative inventory identifier of the first representative object, wherein the first representative inventory identifier represents a first one or more inventory identifier corresponding to the first one or more object respectively, wherein determining the first representative inventory identifier of the first one or more object further comprises:

determining, based on a result of analyzing the first image based on the first representative object model, that a part of the first representative object is associated with a first representative subcategory of the first representative category, wherein the first representative subcategory represents a first one or more subcategory; and retrieving, based on the first representative subcategory, a part of the first representative object model corresponding to the first representative subcategory.

23. A method for object recognition at an interactive information system (IIS), the method comprising:

capturing, using an imaging device of the ITS, a first image of a first representative object, wherein the first representative object represents a first one or more object disposed about the ITS;

analyzing, by a computer processor of the IIS and based on a category model, the first image to determine a first representative category of the first one or more object, wherein the first representative category represents a first one or more category;

retrieving, by the computer processor of the IIS and based on the first representative category, a first representative object model of a plurality of object models that are stored on a remote server, wherein the first representative object model represents a first one or more object model;

analyzing, by the computer processor of the IIS and based on the first representative object model, the first image to determine a first representative inventory identifier of the first representative object, wherein the first representative inventory identifier represents a first one or more inventory identifier corresponding to the first one or more object respectively;

generating, by the computer processor of the IIS and using a first machine learning algorithm, the category model based on a first learning data set comprising a first plurality of training objects corresponding to a plurality of categories; and generating, by the computer processor of the IIS and using a second machine learning algorithm, an object model based on a second learning data set comprising a second plurality of training objects corresponding to a category of a plurality of objects.

24. An interactive information system (IIS), comprising:
an imaging device;
a computer processor; and
memory storing instructions, when executed by the computer processor, comprising functionalities for:

capturing, using the imaging device of the ITS, a first image of a first representative object, wherein the first representative object represents a first one or more object disposed about the ITS;

analyzing, based on a category model, the first image to determine a first representative category of the first one or more object, wherein the first representative category represents a first one or more category;

retrieving, based on the first representative category, a first representative object model of a plurality of object models that are stored on a remote server, wherein the first representative object model represents a first one or more object model;

analyzing, based on the first representative object model, the first image to determine a first representative inventory identifier of the first representative object, wherein the first representative inventory identifier represents a first one or more inventory identifier corresponding to the first one or more object respectively;

generating, using a first machine learning algorithm, the category model based on a first learning data set comprising a first plurality of training objects corresponding to a plurality of categories; and generating, using a second machine learning algorithm, an object model based on a second learning data set comprising a second plurality of training objects corresponding to a category of a plurality of objects.

25. A non-transitory computer readable medium (CRM) storing computer readable program code for object recognition at an interactive information system (IIS), wherein the computer readable program code, when executed by a computer processor of the ITS, comprises functionalities for:

capturing, using an imaging device of the ITS, a first image of a first representative object, wherein the first representative object represents a first one or more objects disposed about the ITS;

analyzing, based on a category model, the first image to determine a first representative category of the first one or more object, wherein the first representative category represents a first one or more category;
retrieving, based on the first representative category, a first representative object model of a plurality of object models that are stored on a remote server, wherein the first representative object model represents a first one or more object model;
analyzing, based on the first representative object model, the first image to determine a first representative inventory identifier of the first representative object, wherein the first representative inventory identifier represents a first one or more inventory identifier corresponding to the first one or more object respectively;
generating, using a first machine learning algorithm, the category model based on a first learning data set comprising a first plurality of training objects corresponding to a plurality of categories; and
generating, using a second machine learning algorithm, an object model based on a second learning data set comprising a second plurality of training objects corresponding to a category of a plurality of objects.

* * * * *